United States Patent
Li

(10) Patent No.: US 11,132,291 B2
(45) Date of Patent: Sep. 28, 2021

(54) SYSTEM AND METHOD OF FPGA-EXECUTED FLASH TRANSLATION LAYER IN MULTIPLE SOLID STATE DRIVES

(71) Applicant: Alibaba Group Holding Limited, Grand Cayman (KY)

(72) Inventor: Shu Li, Bothell, WA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/240,406

(22) Filed: Jan. 4, 2019

(65) Prior Publication Data
US 2020/0218646 A1    Jul. 9, 2020

(51) Int. Cl.
| G06F 12/02 | (2006.01) |
| G06F 12/1081 | (2016.01) |
| G06F 13/28 | (2006.01) |
| G06F 13/16 | (2006.01) |
| G06F 11/14 | (2006.01) |

(52) U.S. Cl.
CPC ...... *G06F 12/0246* (2013.01); *G06F 11/1441* (2013.01); *G06F 12/1081* (2013.01); *G06F 13/1642* (2013.01); *G06F 13/1673* (2013.01); *G06F 13/28* (2013.01); *G06F 2212/7201* (2013.01); *G06F 2212/7203* (2013.01); *G06F 2212/7205* (2013.01)

(58) Field of Classification Search
CPC ............. G06F 12/0246; G06F 12/1081; G06F 11/1441; G06F 13/1679; G06F 13/28
See application file for complete search history.

(56) References Cited

U.S. PATENT DOCUMENTS
3,893,071 A   7/1975  Bossen
4,562,494 A   12/1985 Bond
(Continued)

FOREIGN PATENT DOCUMENTS
WO     9418634     8/1994
WO     1994018634  8/1994

OTHER PUBLICATIONS

Arpaci-Dusseau et al., "Operating Systems: Three Easy Peices;" Origionally published 2015; Pertinent: Chapter 44: Flash-based SSDs; available at: http://pages.cs.wisc.edu/~remzi/OSTEP/.*
(Continued)

*Primary Examiner* — Prasith Thammavong
*Assistant Examiner* — Richard L Sutton
(74) *Attorney, Agent, or Firm* — Shun Yao; Park, Vaughan, Fleming & Dowler LLP.

(57) ABSTRACT

One embodiment facilitates data storage. During operation, the system receives data to be stored in a non-volatile memory of a storage device. The system determines, by a flash translation layer module of a control unit which is distinct from the storage device, a physical page address at which the data is to be stored in the non-volatile memory, wherein the flash translation layer module of the control unit determines physical page addresses for data to be stored in a plurality of storage devices. The system stores, by the flash translation layer module of the control unit, a mapping between a logical page address for the data and the physical page address. The system writes the data to the non-volatile memory at the physical page address.

20 Claims, 10 Drawing Sheets

(56) References Cited

U.S. PATENT DOCUMENTS

| | | |
|---|---|---|
| 4,718,067 A | 1/1988 | Peters |
| 4,775,932 A | 10/1988 | Oxley |
| 4,858,040 A | 8/1989 | Hazebrouck |
| 5,394,382 A | 2/1995 | Hu |
| 5,602,693 A | 2/1997 | Brunnett |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,825,937 B2 | 9/2014 | Atkisson |
| 8,868,825 B1 | 10/2014 | Hayes |
| 8,904,061 B1 | 12/2014 | O'Brien, III |
| 9,015,561 B1 | 4/2015 | Hu |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1* | 9/2016 | Benitez ............... G06F 12/0246 |
| 9,529,601 B1 | 12/2016 | Dharmadhikari |
| 9,588,698 B1 | 3/2017 | Karamcheti |
| 9,588,977 B1 | 3/2017 | Wang |
| 9,607,631 B2 | 3/2017 | Rausch |
| 9,747,202 B1 | 8/2017 | Shaharabany |
| 9,852,076 B1 | 12/2017 | Garg |
| 9,875,053 B2 | 1/2018 | Frid |
| 9,946,596 B2 | 4/2018 | Hashimoto |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,318,467 B2 | 6/2019 | Barzik |
| 10,361,722 B2 | 7/2019 | Lee |
| 10,437,670 B1 | 10/2019 | Koltsidas |
| 10,642,522 B2 | 5/2020 | Li |
| 10,649,657 B2 | 5/2020 | Zaidman |
| 10,956,346 B1* | 3/2021 | Ben-Yehuda ........... G06F 3/068 |
| 2001/0032324 A1 | 10/2001 | Slaughter |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1 | 7/2002 | Chandrasekaran |
| 2002/0161890 A1 | 10/2002 | Chen |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0149827 A1 | 7/2005 | Lambert |
| 2005/0174670 A1 | 8/2005 | Dunn |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0156012 A1 | 7/2006 | Beeson |
| 2007/0033323 A1 | 2/2007 | Gorobets |
| 2007/0061502 A1 | 3/2007 | Lasser |
| 2007/0101096 A1 | 5/2007 | Gorobets |
| 2007/0283081 A1 | 12/2007 | Lasser |
| 2007/0285980 A1 | 12/2007 | Shimizu |
| 2008/0034154 A1 | 2/2008 | Lee |
| 2008/0065805 A1 | 3/2008 | Wu |
| 2008/0082731 A1 | 4/2008 | Karamcheti |
| 2008/0112238 A1 | 5/2008 | Kim |
| 2008/0301532 A1 | 12/2008 | Uchikawa |
| 2009/0006667 A1 | 1/2009 | Lin |
| 2009/0089544 A1 | 4/2009 | Liu |
| 2009/0113219 A1 | 4/2009 | Aharonov |
| 2009/0183052 A1 | 7/2009 | Kanno |
| 2009/0282275 A1 | 11/2009 | Yermalayeu |
| 2009/0287956 A1 | 11/2009 | Flynn |
| 2009/0307249 A1 | 12/2009 | Koifman |
| 2009/0310412 A1 | 12/2009 | Jang |
| 2010/0169470 A1 | 7/2010 | Takashige |
| 2010/0217952 A1 | 8/2010 | Iyer |
| 2010/0229224 A1 | 9/2010 | Etchegoyen |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0292538 A1 | 12/2011 | Haga |
| 2011/0299317 A1 | 12/2011 | Shaeffer |
| 2011/0302353 A1 | 12/2011 | Confalonieri |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0246392 A1 | 9/2012 | Cheon |
| 2012/0278579 A1 | 11/2012 | Goss |
| 2012/0284587 A1 | 11/2012 | Yu |
| 2012/0331207 A1 | 12/2012 | Lassa |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0166820 A1 | 6/2013 | Batwara |
| 2013/0173845 A1 | 7/2013 | Aslam |
| 2013/0191601 A1 | 7/2013 | Peterson |
| 2013/0219131 A1 | 8/2013 | Alexandron |
| 2013/0238955 A1 | 9/2013 | D Abreu |
| 2013/0254622 A1 | 9/2013 | Kanno |

(56) References Cited

U.S. PATENT DOCUMENTS

| | | |
|---|---|---|
| 2013/0318283 A1 | 11/2013 | Small |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0095827 A1 | 4/2014 | Wei |
| 2014/0108414 A1 | 4/2014 | Stillerman |
| 2014/0181532 A1 | 6/2014 | Camp |
| 2014/0195564 A1 | 7/2014 | Talagala |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1* | 1/2015 | Huang ............... G06F 12/0246 711/103 |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0294684 A1 | 10/2015 | Qjang |
| 2015/0301964 A1 | 10/2015 | Brinicombe |
| 2015/0304108 A1 | 10/2015 | Obukhov |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048341 A1 | 2/2016 | Constantinescu |
| 2016/0077749 A1 | 3/2016 | Ravimohan |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0203000 A1 | 7/2016 | Parmar |
| 2016/0232103 A1 | 8/2016 | Schmisseur |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0321002 A1 | 11/2016 | Jung |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0147499 A1 | 5/2017 | Mohan |
| 2017/0161202 A1* | 6/2017 | Erez ................. G06F 3/06 |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0121121 A1* | 5/2018 | Mehra ................. G06F 3/0604 |
| 2018/0143780 A1 | 5/2018 | Cho |
| 2018/0165038 A1 | 6/2018 | Authement |
| 2018/0167268 A1 | 6/2018 | Liguori |
| 2018/0173620 A1 | 6/2018 | Cen |
| 2018/0188970 A1 | 7/2018 | Liu |
| 2018/0189182 A1 | 7/2018 | Wang |
| 2018/0212951 A1 | 7/2018 | Goodrum |
| 2018/0226124 A1 | 8/2018 | Perner |
| 2018/0232151 A1 | 8/2018 | Badam |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0329776 A1 | 11/2018 | Lai |
| 2018/0336921 A1 | 11/2018 | Ryun |
| 2018/0356992 A1 | 12/2018 | Lamberts |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0065085 A1 | 2/2019 | Jean |
| 2019/0073262 A1 | 3/2019 | Chen |
| 2019/0087115 A1 | 3/2019 | Li |
| 2019/0087328 A1 | 3/2019 | Kanno |
| 2019/0171532 A1 | 6/2019 | Abadi |
| 2019/0205206 A1 | 7/2019 | Hornung |
| 2019/0227927 A1 | 7/2019 | Miao |
| 2019/0272242 A1 | 9/2019 | Kachare |
| 2019/0278654 A1 | 9/2019 | Kaynak |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0050385 A1* | 2/2020 | Furey ................. G06F 3/0614 |
| 2020/0097189 A1 | 3/2020 | Tao |
| 2020/0159425 A1 | 5/2020 | Flynn |

OTHER PUBLICATIONS

Arpaci-Dusseau, et. al.; "Operating Systems: Three Easy Pieces;" 2015; Section 44 "Flash-based SSDs;" available at: http://pages.cs.wisc.edu/~remzi/OSTEP/file-ssd.pdf.*

Radian Memory Systems; "FTL SSDs, not NAND Flash, have reached their architectural limit;" copyright 2015; available at: https://www.radianmemory.com/hot-topics-faq/ftl-ssds-not-nand-flash/ (Year: 2015).*

Arpaci-Dusseau, et. al.; "Operating Systems: Three Easy Pieces;" 2015; Section 44 "Flash-based SSDs;" available at: http://pages.cs.wisc.edu/~remzi/OSTEP/file-ssd.pdf (Year: 2015).* https://web.archive.org/web/20071130235034/http://en.wikipedia.org:80/wiki/logical_block_addressing wikipedia screen shot retriefed

(56) References Cited

OTHER PUBLICATIONS on wayback Nov. 20, 2007 showing both physical and logical addressing used historically to access data on storage devices (Year: 2007).

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep 2017, Mumbai, India. pp. 1-7, 2017, <10.1145/3124680.3124741>. <hal-01654985>.

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime," Design, Automation & Text in Europe Conference & Exhibition (DATE), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

\* cited by examiner

SYSTEM AND METHOD OF FPGA-EXECUTED FLASH TRANSLATION LAYER IN MULTIPLE SOLID STATE DRIVES

BACKGROUND

Field

This disclosure is generally related to the field of data storage. More specifically, this disclosure is related to a system and method of FPGA-executed flash translation layer (FTL) in multiple solid state drives (SSDs).

Related Art

The proliferation of the Internet and e-commerce continues to create a vast amount of digital content. Various storage systems and servers have been created to access and store such digital content. In cloud or clustered storage systems, multiple applications may share the underlying system resources (e.g., of the storage devices or drives). A storage system or server can include multiple drives (e.g., a solid state drive (SSD)), and a drive can include non-volatile memory such as NAND flash for persistent storage.

Current SSDs can include a flash translation layer (FTL) running in a device ("device-based FTL"). The computation power and capacity of the device controller can be increased by, e.g., by placing more microprocessors in the SSD controller and by increasing the internal dynamic random access memory (DRAM) capacity of the SSD. However, the device-based FTL of this more powerful SSD is isolated from the host, such that when the logical block address (LBA) is passed into the SSD, the host is left with no knowledge regarding the corresponding physical block address (PBA), i.e., the physical Not-And (NAND) organization for data placement. Thus, this more powerful SSD—with the device-based FTL—is like a black-box system. When one server is equipped with multiple drives (on the order of tens), an individual drive stands alone and has no communication with its peers. Thus, a single slow drive or minority drives which experience a fault can result in the degradation of the system performance. Furthermore, distributing the many more microprocessors inside each of the multiple SSDs running the device-based FTL, and installing firmware on each of the microprocessors, is an overdesign which can lead to a reduced write amplification and an increased wear-leveling of the physical NAND flash. This can result in decreased performance and efficiency of the overall storage system.

Current SSDs can also include a flash translation layer (FTL) running on the host side ("host-based FTL"), which can provide the host with visibility into the LBA-to-PBA mapping. However, the host-based FTL SSDs can consume both the resources of the host central processing unit (CPU) and the capacity utilized by the host DRAM. As the capacity of SSDs continues to increase, so increases both the host CPU consumption and the host DRAM utilization, resulting in a non-trivial resource consumption. While the host-based FTL can provide the host with flexibility and address the black-box challenges associated with the device-based FTL, this non-trivial resource consumption can decrease the efficiency of the overall storage system.

SUMMARY

One embodiment facilitates data storage. During operation, the system receives data to be stored in a non-volatile memory of a storage device. The system determines, by a flash translation layer module of a control unit which is distinct from the storage device, a physical page address at which the data is to be stored in the non-volatile memory, wherein the flash translation layer module of the control unit determines physical page addresses for data to be stored in a plurality of storage devices. The system stores, by the flash translation layer module of the control unit, a mapping between a logical page address for the data and the physical page address. The system writes the data to the non-volatile memory at the physical page address.

In some embodiments, in response to a query from a host for the physical page address, the system transmits, by the control unit to the host, the determined physical page address, wherein the data is held in a volatile memory of the host, wherein the data is written directly, based on a direct memory access protocol, from the volatile memory of the host to the non-volatile memory of the storage device at the physical page address, and wherein the host manages a queue pair comprising a submission queue and a completion queue.

In some embodiments, in response to successfully writing the data to the non-volatile memory of the storage device, a controller of the storage device sends a complete notification to the host. In response to receiving the complete notification, the host updates the queue pair.

In some embodiments, the system holds the data in a volatile memory of the control unit, wherein writing the data to the non-volatile memory at the physical page address involves writing the data directly, based on a direct memory access protocol, from the volatile memory of the control unit to the non-volatile memory of the storage device at the physical page address. The system manages, by the control unit, a queue pair comprising a submission queue and a completion queue.

In some embodiments, in response to successfully writing the data to the non-volatile memory of the storage device, a controller of the storage device sends a complete notification to the control unit. In response to receiving the complete notification, the system updates, by the control unit, the queue pair.

In some embodiments, the plurality of storage devices includes the storage device, and a respective storage device does not include a flash translation layer module.

In some embodiments, the system initiates a garbage collection process. The system reads, by the control unit, valid data from a plurality of pages of blocks to be recycled, wherein the blocks are associated with the plurality of storage devices. The system stores, by the control unit in a temporary data buffer, the valid data read from the plurality of storage devices. In response to obtaining a full block of data in the temporary data buffer, the system writes, by the control unit, the data in the full block to an open block of one of the plurality of storage devices.

In some embodiments, writing the data to the non-volatile memory at the physical page address involves writing the logical page address for the data in an out of band region of a page at the physical page address in the non-volatile memory. Furthermore, in response to detecting a power loss or a power failure, the system: reads out the page at the physical page address; obtains the corresponding logical page address previously written in the out of band region of the page; and updates the mapping between the logical page address and the physical page address based on the obtained corresponding logical page address.

BRIEF DESCRIPTION OF THE FIGURES

In the figures, like reference numerals refer to the same figure elements.

DETAILED DESCRIPTION

Figure 1:
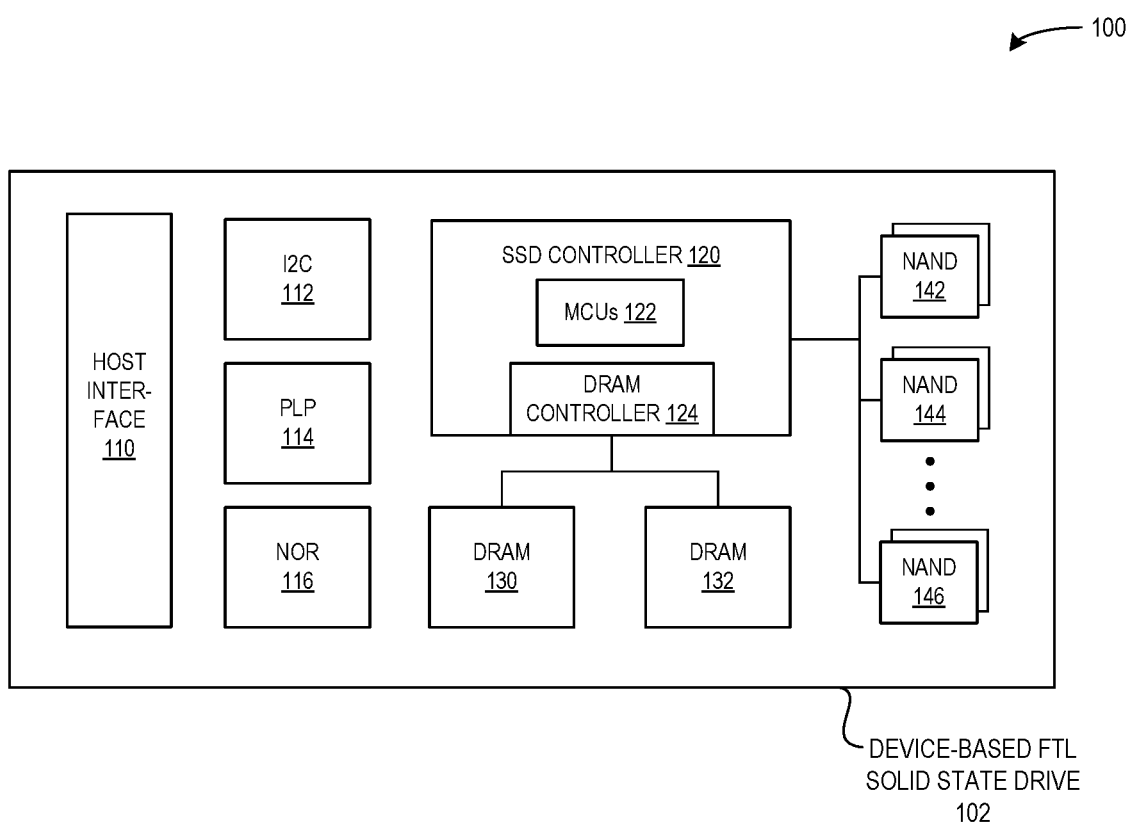
FIG. 1 illustrates an exemplary storage device with a device-based FTL, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which reduces the consumption of host resources by providing a control unit (such as a field programmable gate array (FPGA) card) which performs computational processing, address mapping, and background process management for multiple storage drives.

As described above, current SSDs can include a flash translation layer (FTL) running in a device ("device-based FTL"). The computation power and capacity of the device controller can be increased by, e.g., by placing more microprocessors in the SSD controller and by increasing the internal DRAM capacity of the SSD. However, the device-based FTL of this more powerful SSD is isolated from the host, resulting in the host having no visibility into the LBA-to-PBA mapping, i.e., the physical NAND organization for data placement. Thus, this more powerful SSD—with the device-based FTL—is like a black-box system. When one server is equipped with multiple drives (on the order of tens), an individual drive stands alone and has no communication with its peers. Thus, a single slow drive or minority drives which experience a fault can result in the degradation of the system performance. Furthermore, distributing the many more microprocessors inside each of the multiple SSDs running the device-based FTL, and installing firmware on each of the microprocessors, is an overdesign which can lead to a reduced write amplification and an increased wear-leveling of the physical NAND flash. This can result in decreased performance and efficiency of the overall storage system.

Current SSDs can also include a flash translation layer (FTL) running on the host side ("host-based FTL"), which can provide the host with visibility into the LBA-to-PBA mapping and more control over the back-end operations of the SSD (e.g., garbage collection). However, the host-based FTL SSDs can consume both the resources of the host CPU and the capacity utilized by the host DRAM. As the capacity of SSDs continues to increase, so increases both the host CPU consumption and the host DRAM utilization, resulting in a non-trivial resource consumption. While the host-based FTL can provide the host with flexibility and address the lack of host visibility to the LBA-to-PBA mapping associated with the device-based FTL, this non-trivial resource consumption can decrease the efficiency of the overall storage system.

The embodiments described herein address these problems by providing a control unit which can collaborate with the host cores to handle the majority of the input/output (I/O) processing, and can communicate with the controllers of multiple SSDs. The control unit can also include the FTL module which handles the mapping of the logical to physical addresses for the multiple SSDs, and can manage the background processing of the multiple SSDs. Thus, using the control unit with the FTL module—which handles the address-mapping for the multiple SSDs—can eliminate the overhead involved in the current device-based FTL systems. This can result in a reduced consumption of the host resources.

Furthermore, in some embodiments, the control unit (rather than the host CPU) can both perform computational processing on the data to be stored and handle the submission queue (SG) and the completion queue (CQ) (referred to together as the "queue pair"). This can also reduce the consumption of the host resources.

Thus, the embodiments described herein provide a system with a control unit which performs computational processing, address mapping, and background process management for multiple storage drives, which decreases the host CPU consumption and the host DRAM utilization, and results in an improved and more efficient storage system.

The term "control unit" refers to a component, unit, or module which can perform the operations described herein. In this disclosure, the control unit is illustrated as, e.g., a field programmable gate array (FPGA) card. The control unit can also be incorporated onto an application-specific integrated circuit (ASIC), e.g., as firmware. The operations of the control unit can also be performed by a specific microprocessor with its own low-level operating system, or spread across multiple ASICs or other ICs. The control unit can also be installed as part of or as it own individual hardware, firmware, or software component (or any combination thereof) which communicates with the host and the storage devices in the manner described herein.

The term "queue pair" refers to a submission queue (SQ) and a completion queue (CQ). Commands to be executed are placed in the SQ, while commands which are completed (or an indication that a command has been completed) are placed in the CQ.

Exemplary Environment in the Prior Art (Device-Based FTL)

FIG. 1 illustrates an exemplary storage device 100 with a device-based FTL, in accordance with the prior art. Storage device 100 can be an SSD, which includes: a host interface 110; an inter-integrated circuit (I2C) serial bus 112; a power loss protection (PLP) module 114; Not-Or (NOR) memory 116; an SSD controller 120 with microprocessors (MCUs) 122 and a DRAM controller 124; DRAM 130 and 132; and NAND dies 142, 144, and 146.

Including more microprocessors and increasing the internal DRAM capacity, as well as installing firmware to run the FTL module via the MCUs, can result in a more powerful SSD with a device-based FTL, e.g., by increasing the number of MCUs 122 and the capacity of DRAMs 130 and 132. However, as described above, multiple SSDs which run a respective device-based FTL can result in multiple, isolated black box systems, where each individual drive stands alone and has no communication with its peers. This lack of communication and visibility can result in degradation of the system performance. The overdesign of the distributed multiple microprocessors can also result in a reduced write amplification and an increased wear-leveling of the physical NAND flash. Thus, the more powerful SSDs (such as SSD 100) with the device-based FTL can result in decreased performance and efficiency of the overall storage system.

Exemplary Environment for Facilitating Data Storage (Control Unit-Based FTL)

The embodiments described herein solve the challenges and inefficiencies associated with the device-based FTL by providing a system with a control unit which includes an FTL module that handles and stores the mapping of logical to physical page addresses for multiple storage drives in a storage system. The control unit can be a field programmable gate array (FPGA) card which performs computational processing, address mapping, and background process management for multiple storage drives. For example, the control unit can communicate with the host CPUs to handle a significant amount (e.g., a large majority) of I/O processing by performing computation or processing of incoming I/O data (as described below in relation to FIGS. 4 and 5A), and the control unit can also perform background processing to improve the efficiency of the overall storage system (as described below in relation to FIGS. 6 and 7).

Figure 2:
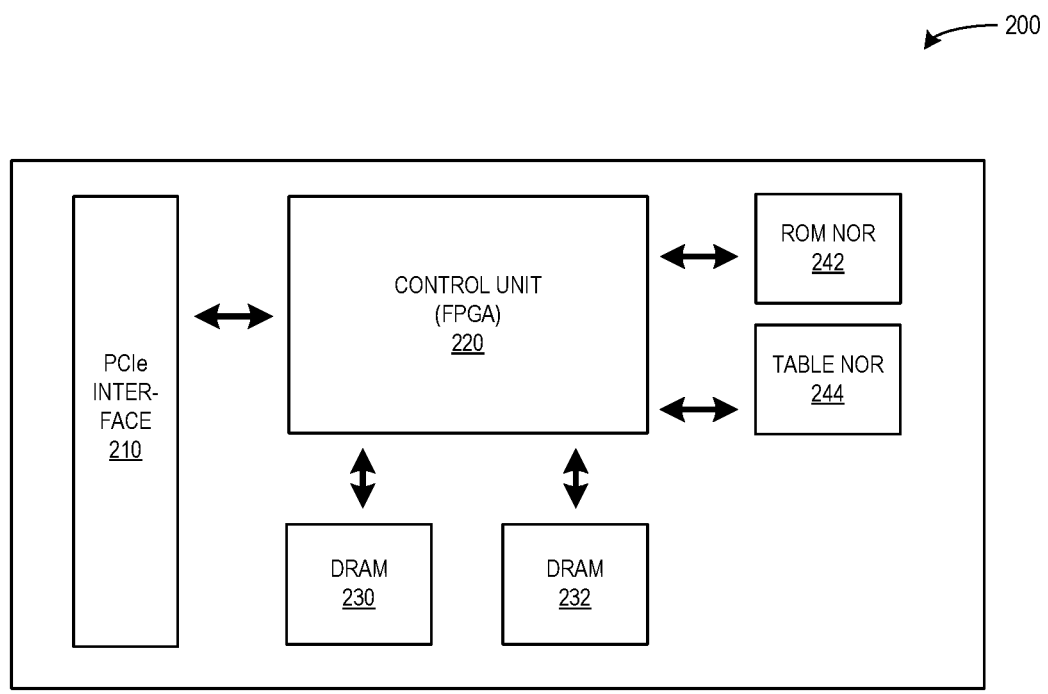
FIG. 2 illustrates an exemplary architecture for facilitating data storage, including a control unit with an FTL module, in accordance with an embodiment of the present application.

FIG. 2 illustrates an exemplary architecture 200 for facilitating data storage, including a control unit with an FTL module, in accordance with an embodiment of the present application. Architecture 200 can include control unit 220, such as an FPGA card. FPGA 220 can communicate with and be connected to a host via a Peripheral Component Interconnect Express (PCIe) interface 210. FPGA 220 can also be paired with an abundant amount of DRAM (e.g., DRAM 230 and 232) for buffering data and mapping information. FPGA 220 can include two kinds of NOR flash memory: read-only memory (ROM) NOR 242; and a table NOR 244. ROM NOR 242 can hold data relating to the design of FPGA 220. Table NOR 244 can persistently store the mapping between a logical page address and the corresponding physical page address (e.g., the logical-to-physical ("L2P") mapping information). Table NOR 244 can be represented as a table or other data structure with entries which correspond to specific data based on its LPA or determined PPA.

During operation, the system can store the L2P mapping information in DRAM (e.g., DRAM 230 or 232), and can update the L2P mapping information based on NAND address operations. The system can periodically write the stored mapping information from the volatile memory (DRAM 230 or 232) to the non-volatile memory (table NOR 244). This periodic writing or flushing can be based on a predetermined time period or interval, and can also be based on reaching a predetermined size of the table (or other data structure) which stores the L2P mapping information.

Furthermore, when the system writes one physical page of data to the non-volatile memory (e.g., NAND flash) of an associated storage drive (not shown), the system can also write the corresponding logical page address into the same physical page's out-of-band (OOB) region to maintain the mapping information. If the system experiences a power loss or a power failure, the system can construct the most recent mapping table by reading out the mapping information previously written in the physical page stored in the NAND flash.

The system can thus provide power loss protection by writing the logical page address into the OOB region of a same corresponding physical page. Moreover, by storing the L2P mapping information in table NOR 244, the system can accelerate the loading of multiple high-capacity storage drives. As a result, the embodiments described herein can result in reducing the amount of resources consumed by the host and by each specific SSD, which can lead to an improved and more efficient overall storage system.

Exemplary Environment: Control Unit with FTL

Figure 3:
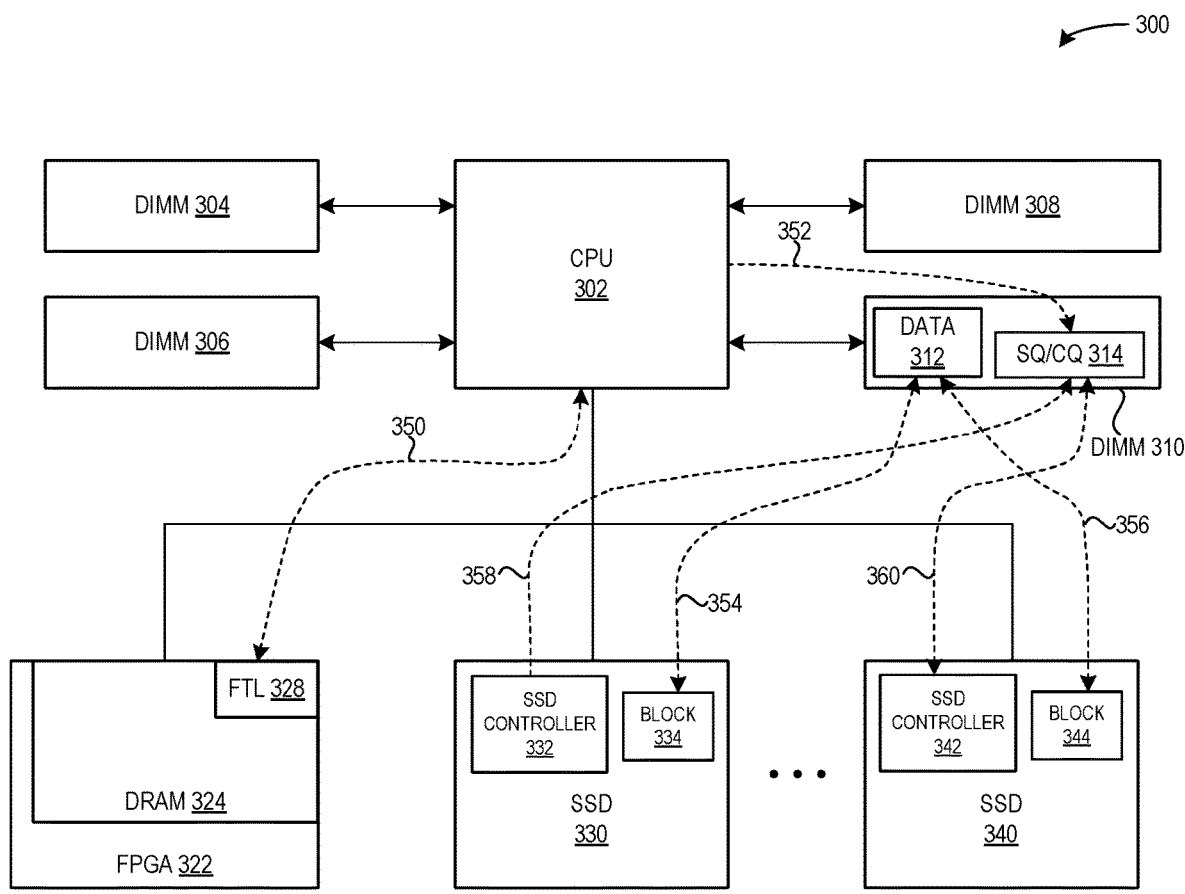
FIG. 3 illustrates an exemplary environment for facilitating data storage, including a control unit with an FTL module, in accordance with an embodiment of the present application.

FIG. 3 illustrates an exemplary environment 300 for facilitating data storage, including a control unit with an FTL module, in accordance with an embodiment of the present application. Environment 300 can include a host with a CPU 302 and DIMMs 304, 306, 308, and 310. DIMM 310 can include data 312 and a queue pair which comprises a submission queue (SQ)/completion queue (CQ) 314. Environment 300 can also include a control unit (e.g., FPGA 322) and multiple storage drives (e.g., SSDs 330 and 340). FPGA 322 can include DRAM 324 and an FTL module 328. SSD 330 can include an SSD controller 332, and SSD 340 can include an SSD controller 342. SSD 330 can be a simplified SSD which does not include any microprocessors or internal DRAM. In some embodiments, SSD 330 can include only a single or simple microprocessor, and a limited amount of DRAM. SSD 330 is a "simplified SSD," which is different and distinct from the more "powerful" SSD with the device-based FTL depicted above in relation to FIG. 1. This simplified SSD still has a controller which can perform low-level tasks (such as managing the NAND media), but the higher-level tasks (such as FTL mapping and updating) can instead be performed by the control unit (e.g., FPGA 322).

Environment 300 depicts communications involved in handling the I/O from the host CPU without any further computation or processing of data by the FPGA. During operation, the system can receive data to be written to a non-volatile memory of a storage device (e.g., to NAND flash of an SSD). The system can hold the data in the host DIMM (as data 312 in DIMM 310). CPU 302 can send to FPGA 322 a write request and a query to obtain a physical page address to which to write the associated stored data (e.g., data 312 in DIMM 310, which has a certain logical page address) (via a communication 350). FPGA 322 can receive the write request and query (communication 350), and FTL module 328 can determine and assign the physical page address for the associated stored data. FPGA 322 can return the assigned physical page address to CPU 302 (communication 350). CPU 302 can check the returned physical page address, and place in SQ 314 a command to write the requested data at the returned physical page address (via a communication 352).

The host (via CPU 302) can work with the SSDs (via, e.g., SSD controllers 332 and 342) to write the data to SSDs 330 and 340. For example, SSD controller 332 can obtain the placed write command from SQ 314, and execute the write command by writing data 312 to the NAND flash of SSD 330 (e.g., to a block 334 of the NAND flash of SSD 330). Similarly, SSD controller 342 can obtain another placed write command from SQ 314, and execute the other write command by writing (part of) data 312 to the NAND flash of SSD 340 (e.g., to a block 344 of the NAND flash of SSD 340). Writing data 312 to block 334 (via a communication 354) or to block 344 (via a communication 356) can be based on a direct memory access (DMA) protocol. Upon successfully executing the write command, SSD controller 332 can send to the host (via a communication 358) a complete notification, which can be a message which causes the host to place the completed command into CQ 314. Similarly, upon successfully executing the other write command, SSD controller 342 can send to the host (via a communication 360) a complete notification, can be a message which causes the host to place the completed command into CQ 314.

For a read operation, host CPU 302 can send to FPGA 322 a read request and a query (via communication 350) to obtain the physical page address associated with the data to be read (e.g., data previously stored in block 344 of NAND flash of SSD 340 via communication 356). FPGA 322 can receive the read request and query (communication 350), and can determine and return to CPU 302 (via communication 350) the physical page address associated with the logical page address for the data to be read. CPU 302 can check the returned physical page address, and place in SQ 314 a command to read the requested data at the returned physical page address (via a communication 352). SSD controller 342 can obtain the placed read command from SQ 314, and execute the read command by reading data stored in block 344 of the NAND flash of SSD 340. Reading data from block 344 and placing it in DIMM 310 can be based on a DMA protocol. Upon successfully executing the read command, SSD controller 342 can send to the host (via a communication 360) a complete notification, which can be a message which causes the host to place the completed command into CQ 314.

Thus, environment 300 depicts communications involved in handling the I/O from the host CPU without any further computation or processing of data by the control unit, where the control unit is an FPGA which assigns and stores the L2P mapping for data stored in the non-volatile memory of the plurality of storage drives (e.g., the NAND flash of SSDs 330 and 340). In environment 300, the host can hold, in a temporary data buffer of its DIMM (e.g., as data 312), the data to be written to the NAND flash of the SSDs. The host can also store and manage the queue pair (e.g., SQ/CQ 314).

By placing the FTL in a control unit which manages the L2P mapping for multiple storage drives, the embodiments described herein alleviate the burden of storing the FTL in the DRAM of each SSD or in the DRAM of the host (as in the prior art). Thus, this results in a reduced resource consumption on the host side, which can result in an improved and more efficient storage system.

Figure 4:
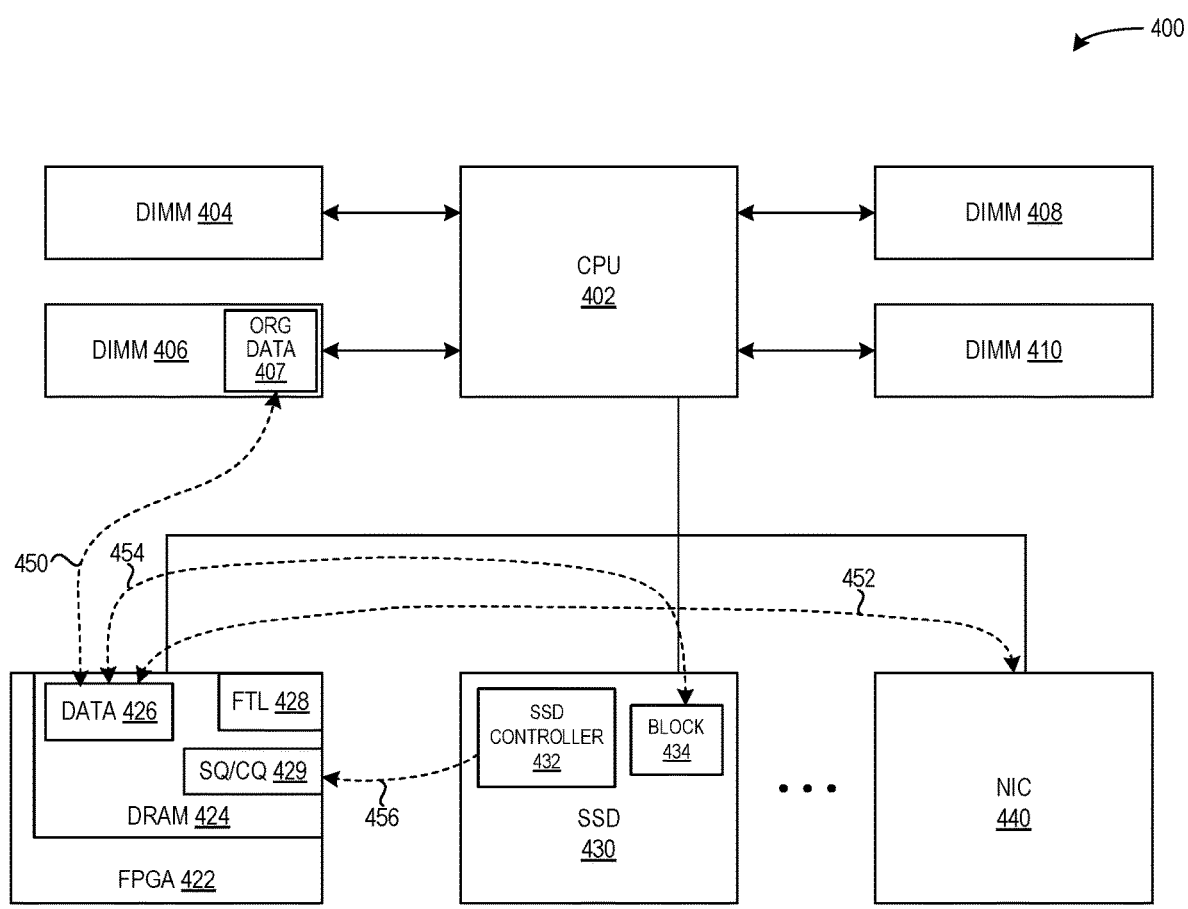
FIG. 4 illustrates an exemplary environment for facilitating data storage, including a control unit with an FTL module, a queue pair, and data to be written to a storage drive, in accordance with an embodiment of the present application.

Exemplary Environment: Control Unit with FTL, Queue Pair, and Data to be Written to a Storage Device In some embodiments, the control unit performs computational processing, address mapping, and background process management across and for multiple storage drives. FIG. 4 illustrates an exemplary environment 400 for facilitating data storage, including a control unit with an FTL module, a queue pair, and data to be written to a storage drive, in accordance with an embodiment of the present application.

Environment 400 can include a host with a CPU 402 and DIMMs 404, 406, 408, and 410. DIMM 406 can include organizational data 407. Environment 400 can also include a control unit (e.g., FPGA 422), multiple storage drives (e.g., SSD 430), and a network interface card (NIC) 440 via which network traffic is received. FPGA 422 can include DRAM 424, including an FTL module 428 and a queue pair which comprises a submission queue (SQ)/completion queue (CQ) 429. SSD 430 can include an SSD controller 432. Similar to SSDs 330 and 340 of FIG. 3, SSD 430 can be a simplified SSD which does not include any microprocessors or internal DRAM.

Environment 400 depicts communications involved in handling the I/O from the host CPU with further computation or processing of data by the FPGA. During operation, the system can receive data to be written to a non-volatile memory of a storage device (e.g., to NAND flash of an SSD). The system can receive the data via NIC 440 (via a DMA communication 452), and can hold the data in the DRAM of FPGA 422 (as data 426 in DRAM 424). FPGA 422 can communicate with DIMM 406 to determine organizational data relating to data 426 (via a communication 450). FPGA 422, via FTL module 428, can determine the physical page to address to which to write the associated stored data (e.g., data 426 in DRAM 424). FPGA 422 can also place in SQ 429 a command to write the requested data at the determined physical page address.

FPGA 422 can work with the SSDs (via, e.g., SSD controller 432) to write the data to SSD 430. For example, SSD controller 432 can obtain the placed write command from SQ 429, and execute the write command by writing, based on a DMA protocol, data 426 to the NAND flash of SSD 430 (e.g., to a block 434 of the NAND flash of SSD 430). Upon successfully executing the write command, SSD controller 432 can send to FPGA 422 (via communication 456) a complete notification, which can be a message which causes FPGA 422 to place the completed command into CQ 429.

Thus, environment 400 depicts how the control unit performs computational processing and address mapping for multiple storage devices, which results in alleviating the load on the host CPU and DRAM. By placing in the DRAM of the control unit the elements previously placed in the host (i.e., the FTL module, the queue pair, and the data to be written to persistent storage), the embodiments described herein result in reducing both the amount of resources consumed by the host CPU and the amount of space utilized by the host DRAM.

Exemplary Method for Facilitating Data Storage

Figure 5A:
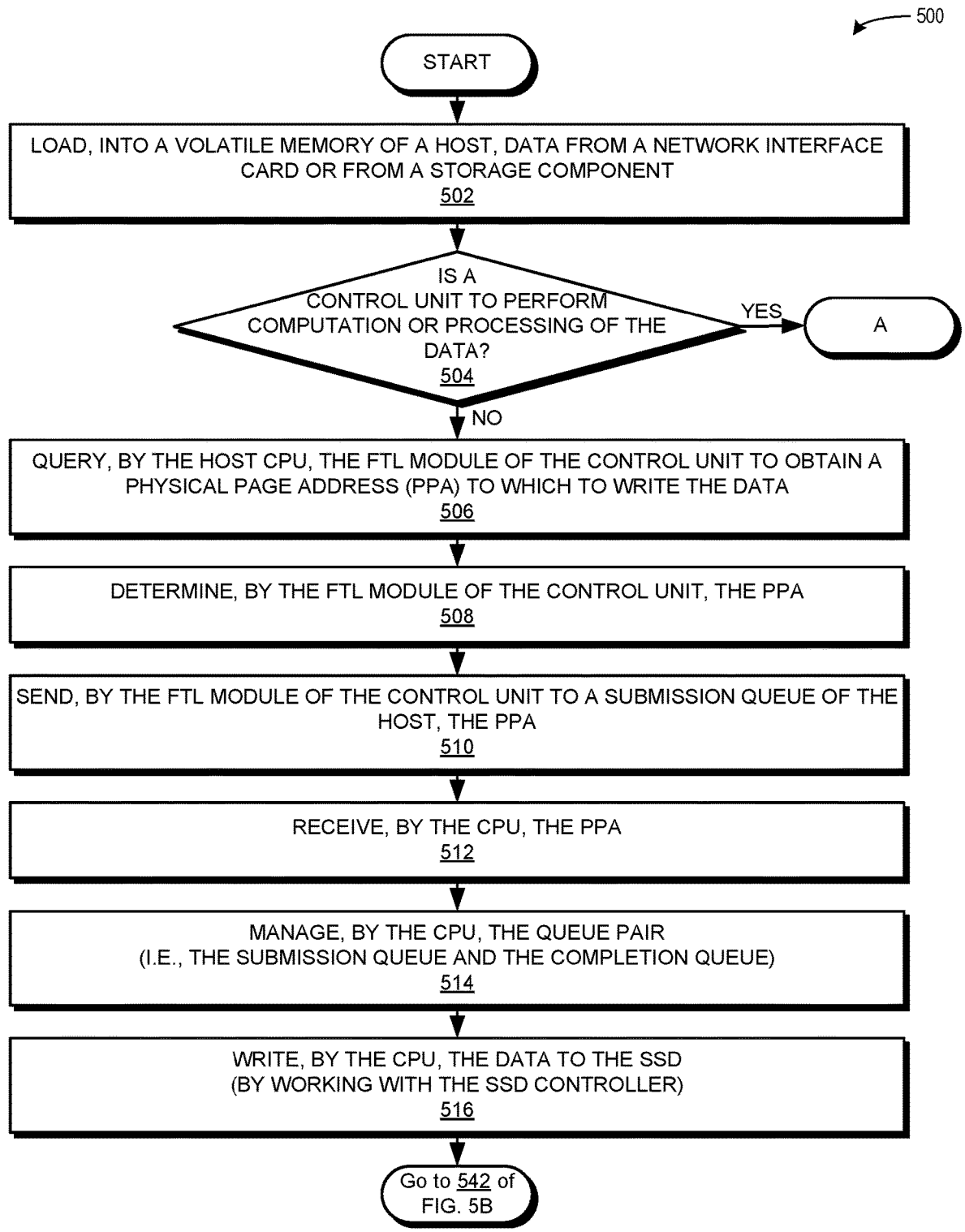
FIG. 5A presents a flowchart illustrating a method for facilitating data storage, associated with the environment of FIG. 3, in accordance with an embodiment of the present application.

FIG. 5A presents a flowchart 500 illustrating a method for facilitating data storage, associated with the environment of FIG. 3, in accordance with an embodiment of the present application. During operation, the system loads, into a volatile memory of a host, data from a network interface card or from a storage component (operation 502). The system determines whether a control unit is to perform computation or processing of the data (decision 504). If the control unit is to perform computation or processing of the data (decision 504), the operation continues as described at Label A of FIG. 5B. If the control unit is not to perform computation or processing of the data (decision 504), the system queries, by the host CPU, the FTL module of the control unit to obtain a physical page address (PPA) to which to write the data (operation 506). The system determines, by the FTL module of the control unit, the PPA (operation 508). The system sends, by the FTL module of the control unit to a submission queue of the host, the PPA (operation 510). The system receives, by the CPU, the PPA (operation 512). The system manages, by the CPU, the queue pair (i.e., the submission queue and the completion queue). The system writes, by the CPU, the data to the SSD (by working with the SSD controller) (operation 516), and the operation continues at operation 542 of FIG. 5B.

Figure 5B:
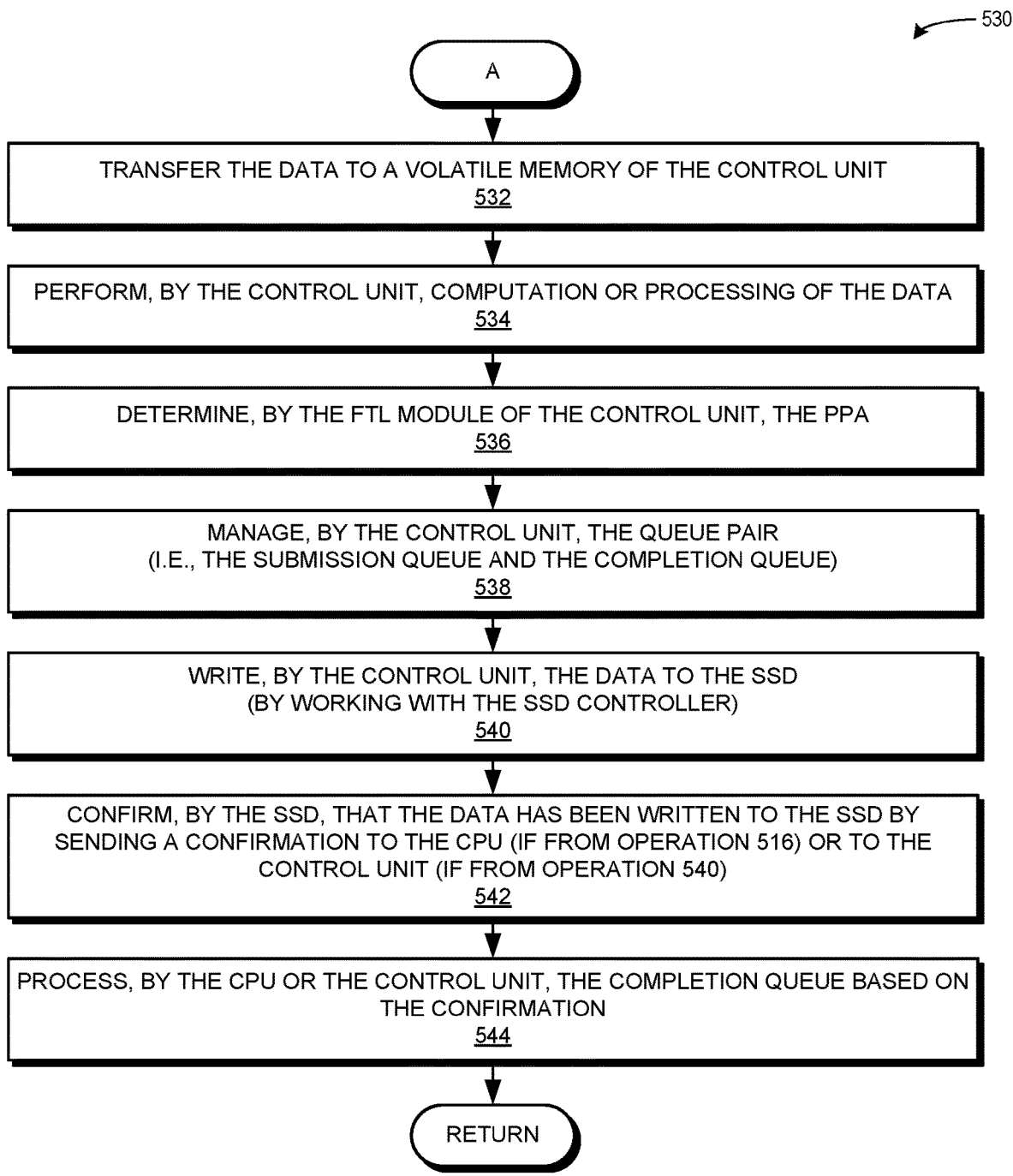
FIG. 5B presents a flowchart illustrating a method for facilitating data storage, associated with the environment of FIG. 4, in accordance with an embodiment of the present application.

FIG. 5B presents a flowchart 530 illustrating a method for facilitating data storage, associated with the environment of FIG. 4, in accordance with an embodiment of the present application. During operation, the system transfers the data to a volatile memory of the control unit (operation 532). The system performs, by the control unit, computation or processing of the data (operation 534). The system can thus offload some of the CPU's required computations to the control unit, and further allow the control unit to both hold the calculated result (or the updated data) and handle the subsequent data write into the NAND flash. That is, original data may be received via from the CPU or from the network (via the NIC). Rather than sending the data back to the CPU to process and handle writing the data to the non-volatile memory (e.g., the SSD), the control unit (e.g., the FPGA) can build the queue pair and directly write the data to the non-volatile memory based on a DMA protocol. The control unit can subsequently update the mapping information, which is stored in the DRAM of the control unit.

The system determines, by the FTL module of the control unit, the PPA (operation 536). The system manages, by the control unit, the queue pair (i.e., the submission queue and the completion queue) (operation 538). The system writes, by the control unit, the data to the SSD (by working with the SSD controller) (operation 540). The system confirms, by the SSD, that the data has been written to the SSD by sending a confirmation to the CPU (if the operation is preceded by and reached from operation 516) or the control unit (if the operation is preceded by and reached from operation 540) (operation 542). The system processes, by the CPU or the control unit, the completion queue based on the confirmation (operation 544), and the operation returns.

Improved Garbage Collection: Exemplary Environment and Method

Figure 6:
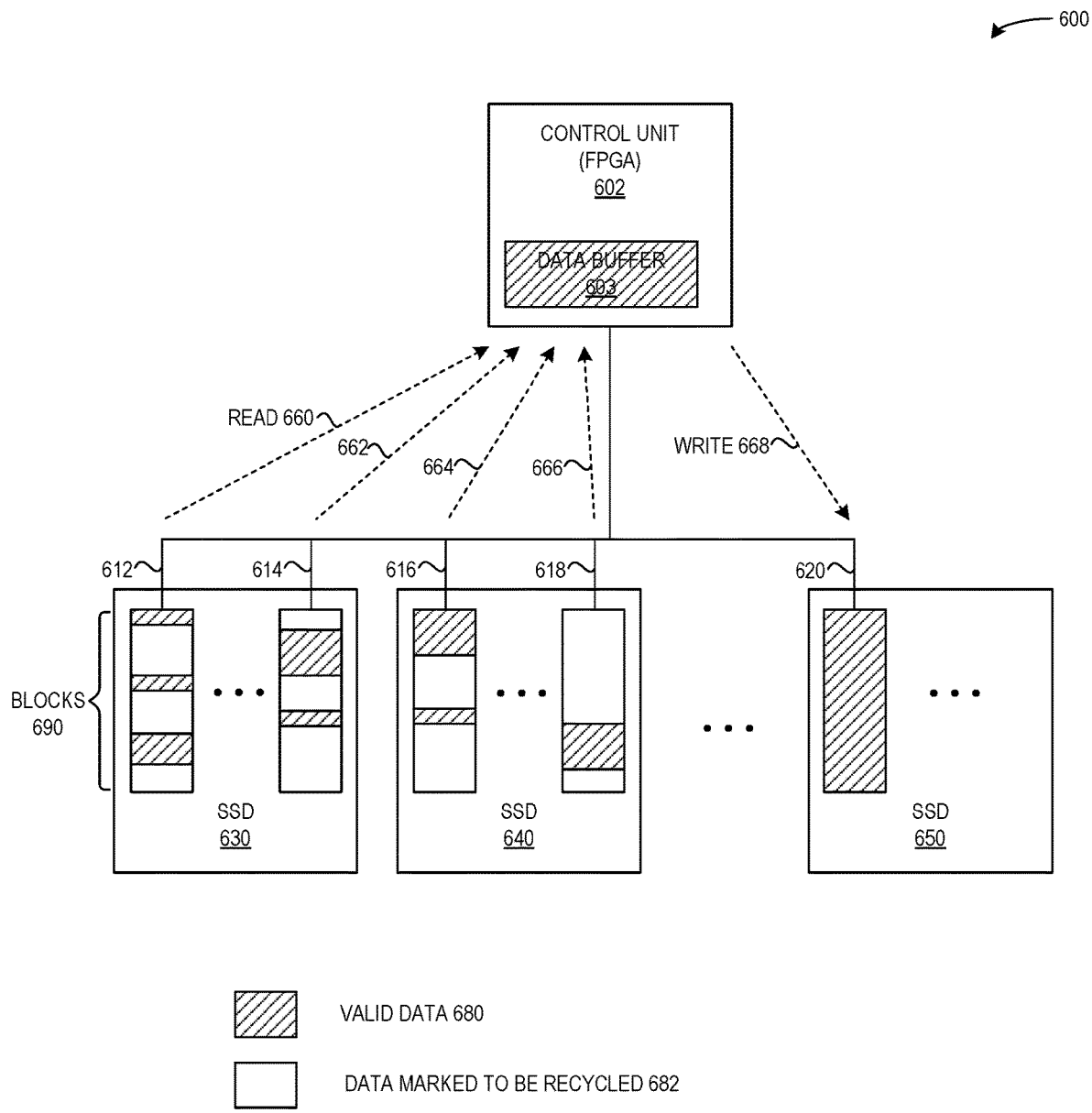
FIG. 6 illustrates an exemplary environment computer system that facilitates data storage, including a garbage collection process, in accordance with an embodiment of the present application.

FIG. 6 illustrates an exemplary environment 600 that facilitates data storage, including a garbage collection process, in accordance with an embodiment of the present application. Environment 600 can include a control unit (FPGA) 602 and a plurality of SSDs, such as SSDs 630, 640, and 650. Each SSD can include blocks of data (indicated by blocks 690). Each block can include valid pages of data (indicated by diagonally right-slanting lines in the index as valid data 680) and invalid pages of data (indicated with no pattern in the index as data marked to be recycled 682). A background garbage collection process can identify, across the plurality of storage devices, blocks to be recycled, where the blocks are associated with the plurality of storage devices. FPGA 602 can read the data from the valid pages, e.g., reads 660, 662, 664, and 666, via, respectively, NAND channels 612, 614, 616, and 618. FPGA 602 can store the read valid data in a temporary data buffer 603, and, upon filling a block of data, FPGA 602 write a full block of data to an open block of an SSD (e.g., a write 668 via NAND channel 620 to SSD 650).

Thus, the embodiments described herein provide an improved garbage collection, because the control unit can read valid data on a page-by-page basis from multiple blocks to be recycled from multiple SSDs and can also write data to an open block of an SSD on a block-by-block basis. By reading pages out from multiple SSDs, rather than from a single SSD, the system can more easily and quickly form a whole block of data to be written to an open block as part of the garbage collection process. This can reduce the likelihood of an open block. Furthermore, by reducing the number of open blocks, the system can increase the reliability of the data stored in the non-volatile memory.

Figure 7:
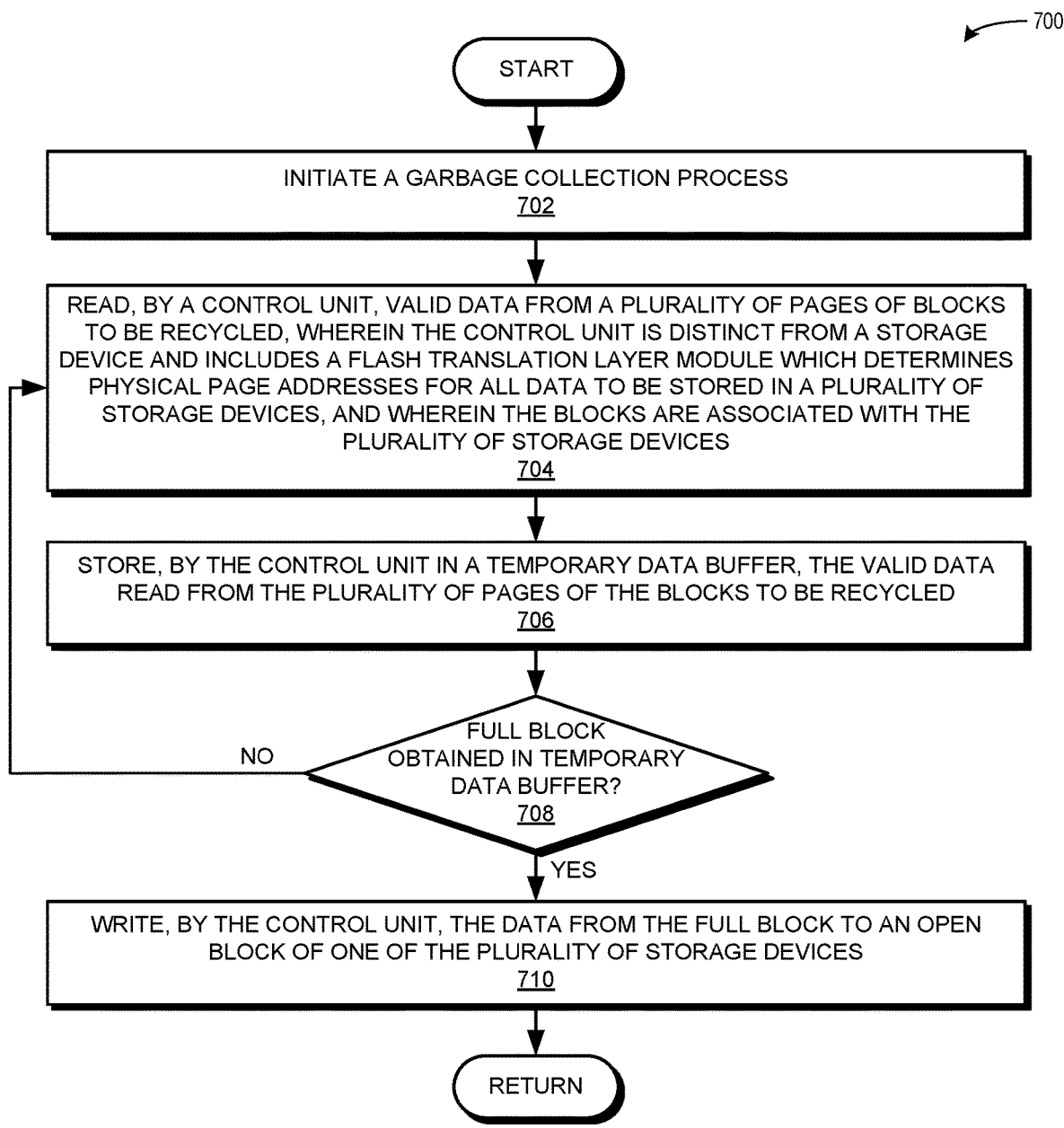
FIG. 7 presents a flowchart illustrating a method for facilitating data storage, associated with the environment of FIG. 6, in accordance with an embodiment of the present application.

FIG. 7 presents a flowchart 700 illustrating a method for facilitating data storage, associated with the environment of FIG. 6, in accordance with an embodiment of the present application. During operation, the system initiates a garbage collection process (operation 702). The system reads, by a control unit, valid data from a plurality of pages of blocks to be recycled, wherein the control unit is distinct from a storage device and includes a flash translation layer module which determines physical page addresses for all data to be stored in a plurality of storage devices, and wherein the blocks are associated with the plurality of storage devices (operation 704). The system stores, by the control unit in a temporary data buffer, the valid data read from the plurality of pages of the blocks to be recycled (operation 706). If the system determines that a full block is not obtained in the temporary data buffer (decision 708), the operation continues at operation 704.

If the system determines that a full block is obtained in the temporary data buffer (decision 708), the system writes, by the control unit, the data from the full block to an open block of one of the plurality of storage devices (operation 710), and the operation returns.

Exemplary Computer System and Apparatus

Figure 8:
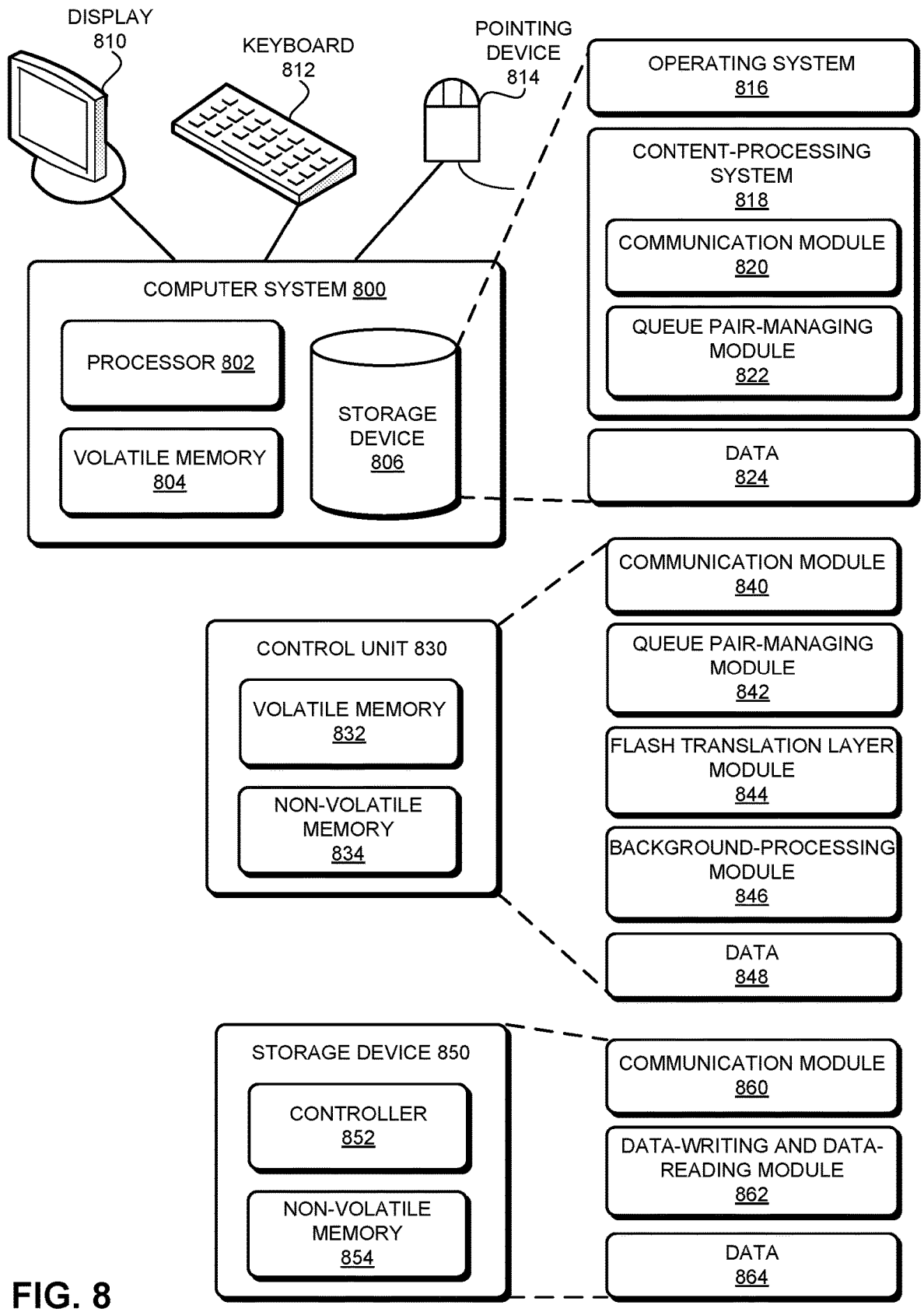
FIG. 8 illustrates an exemplary computer system, control unit, and storage device that facilitate data storage, in accordance with an embodiment of the present application.

FIG. 8 illustrates an exemplary computer system 800, control unit 830, and storage device 850 that facilitate data storage, in accordance with an embodiment of the present application. Computer system 800 includes a processor 802, a volatile memory 804, and a storage device 806. Computer system 800 may be a computing device or a storage device. Volatile memory 804 can include memory (e.g., RAM) that serves as a managed memory, and can be used to store one or more memory pools. Volatile memory 804 can include DRAM for holding data to be stored in persistent non-volatile memory and a queue pair. Computer system 800 can be coupled to a display device 810, a keyboard 812, and a pointing device 814. Storage device 808 can store an operating system 816, a content-processing system 818, and data 824.

Content-processing system 818 can include instructions, which when executed by computer system 800, can cause computer system 800 to perform methods and/or processes described in this disclosure. For example, content-processing system 818 can include instructions for receiving and transmitting data packets, including a request to write or read data, an I/O request, data to be encoded and stored, a block or a page of data, a PPA, an LPA, and a mapping (communication module 820). Content-processing system 818 can further include instructions for receiving data to be stored in a non-volatile memory of a storage device (communication module 820). Content-processing system 818 can further include instructions for managing and updating a queue pair (queue pair-managing module 822).

Control unit 830 can include a volatile memory 832 and a non-volatile memory 834. Volatile memory 832 can include an FTL module, DRAM for holding data to be stored in persistent non-volatile memory, and a queue pair. Non-volatile memory 834 can include L2P mapping information (e.g., as table NOR 244 of FIG. 2). Control unit 830 can include instructions, which when executed by control unit 830, can cause control unit 830 to perform methods and/or processes described in this disclosure. Control unit 830 can include instructions for receiving data to be stored in a non-volatile memory of a storage device (communication module 840). Control unit 830 can include instructions for determining, by a flash translation layer module of a control unit which is distinct from the storage device, a physical page address at which the data is to be stored in the non-volatile memory (flash translation layer module 844). Control unit 830 can include instructions for storing, by the flash translation layer module of the control unit, a mapping between a logical page address for the data and the physical page address (flash translation layer module 844). Control unit 830 can include instructions for writing the data to the non-volatile memory at the physical page address (communication module 840). Control unit 830 can further include instructions for managing and updating a queue pair (queue pair-managing module 842). Control unit 830 can further include instructions for: initiating a garbage collection process (background-processing module 846); reading, by the control unit, valid data from a plurality of pages of blocks to be recycled, wherein the blocks are associated with the plurality of storage devices (communication module 840); storing, by the control unit in a temporary data buffer, the valid data read from the plurality of storage devices (background-processing module 846); and in response to obtaining a full block of data in the temporary data buffer, writing, by the control unit, the data in the full block to an open block of one of the plurality of storage devices (background-processing module 846).

Storage device 850 can include a controller 852 and a non-volatile memory 854. Storage device 850 can include instructions, which when executed by storage device 850, can cause storage device 850 to perform methods and/or processes described in this disclosure. Storage device 850 can include instructions for obtaining commands from a queue pair of computer system 800 or control unit 830 (communication module 860). Storage device 850 can include instructions for executing the obtained (I/O) commands (data-writing and data-reading module 862). Storage device 850 can include instructions for sending a complete notification to the host or the control unit (communication module 860).

Data 824, 848, and 864 can include any data that is required as input or that is generated as output by the methods and/or processes described in this disclosure. Specifically, data 824, 848, and 864 can store at least: data to be stored, written, loaded, moved, retrieved, accessed, deleted, or copied; a temporary data buffer; an indicator of a controller of a storage device; a physical page of data; a block of data; an acknowledgment that data is successfully committed or has been written to a non-volatile memory; an indicator of a detected power loss; an indicator of a control unit, an SSD, and a host; a table; a data structure; a physical page address (PPA); a logical page address (LPA); a flash translation layer; a mapping between an LPA and a PPA; valid data; invalid data; an indicator of a background process or a garbage collection process; a trigger or condition to begin a background process or a garbage collection process; an out of band region; an indicator of a power loss or a power failure; a queue pair; a submission queue; and a completion queue.

Figure 9:
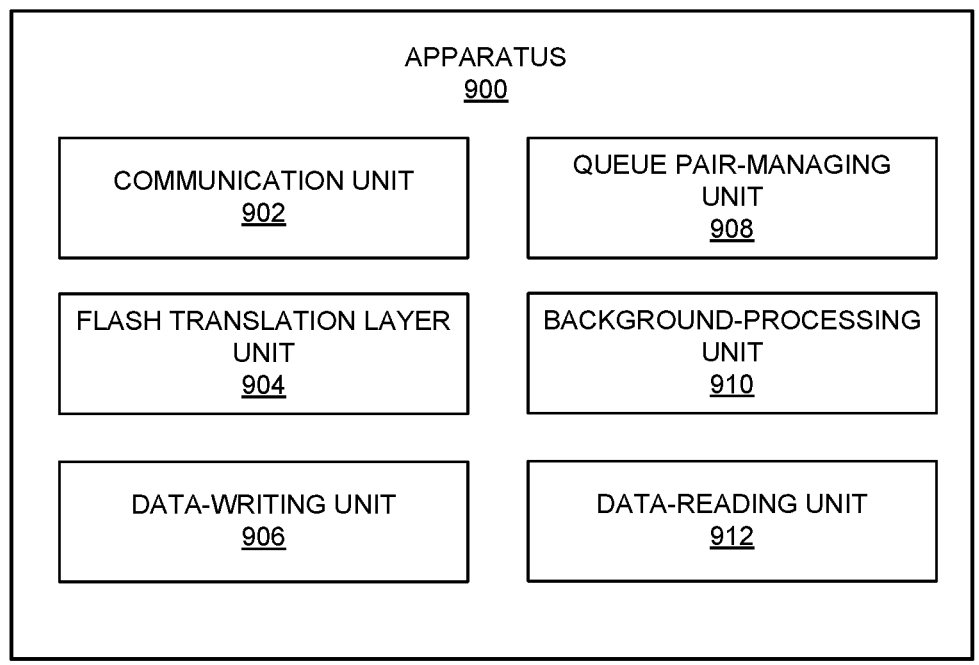
FIG. 9 illustrates an exemplary apparatus that facilitates data storage, in accordance with an embodiment of the present application.

FIG. 9 illustrates an exemplary apparatus 900 that facilitates data storage, in accordance with an embodiment of the present application. Apparatus 900 can comprise a plurality of units or apparatuses which may communicate with one another via a wired, wireless, quantum light, or electrical communication channel. Apparatus 900 may be realized using one or more integrated circuits, and may include fewer or more units or apparatuses than those shown in FIG. 9. Further, apparatus 900 may be integrated in a computer system, or realized as a separate device which is capable of communicating with other computer systems and/or devices. Specifically, apparatus 900 can comprise units 902-912 which perform functions or operations similar to modules 820-822 of computer system 800 of FIG. 8, modules 840-846 of control unit 830 of FIG. 8, and module 862 of storage device 850 of FIG. 8, including: a communication unit 902; a flash translation layer unit 904; a data-writing unit 906; a queue pair-managing unit 908; a background-processing unit 910; and a data-reading unit 912. Note that while units 902-912 are depicted in a single apparatus in FIG. 9, these units can correspond to the modules of the three separate entities depicted in FIG. 8.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating data storage, the method comprising:
receiving data to be stored in a non-volatile memory of a storage device of a plurality of storage devices;

determining, by a flash translation layer module of a control unit, a physical page address at which the data is to be stored in the non-volatile memory, wherein the control unit is distinct from a host and the plurality of storage devices, and wherein the control unit runs separately from the host and the plurality of storage devices, wherein the flash translation layer module of the control unit determines physical page addresses for first data to be stored in the plurality of storage devices, wherein the control unit communicates with controllers of the plurality of storage devices, and wherein the control unit manages a queue pair comprising a submission queue and a completion queue;

placing, by the control unit in the submission queue, a command to write the data at the physical page address;

storing, by the flash translation layer module of the control unit, a mapping between a logical page address for the data and the physical page address; and writing the data to the non-volatile memory at the physical page address, wherein a controller of the storage device obtains the command from the submission queue, executes the command, and sends to the control unit a complete notification, which causes the control unit to place the command in the completion queue.

2. The method of claim 1, further comprising:

in response to a query from a host for the physical page address, transmitting, by the control unit to the host, the determined physical page address, wherein the data is held in a volatile memory of the host, wherein the data is written directly, based on a direct memory access protocol, from the volatile memory of the host to the non-volatile memory of the storage device at the physical page address, and wherein the host manages a second queue pair comprising a second submission queue and a second completion queue.

3. The method of claim 2, wherein in response to successfully writing the data to the non-volatile memory of the storage device, the controller of the storage device sends a complete notification to the host, and wherein in response to receiving the complete notification, the host updates the second queue pair.

4. The method of claim 1, further comprising:

holding the data in a volatile memory of the control unit, wherein writing the data to the non-volatile memory at the physical page address involves writing the data directly, based on a direct memory access protocol, from the volatile memory of the control unit to the non-volatile memory of the storage device at the physical page address; and managing, by the control unit, the queue pair comprising the submission queue and the completion queue.

5. The method of claim 4, wherein in response to successfully writing the data to the non-volatile memory of the storage device, the controller of the storage device sends to the control unit the complete notification, and wherein the method further comprises:

in response to receiving the complete notification, updating, by the control unit, the queue pair.

6. The method of claim 1, wherein the plurality of storage devices includes the storage device, and wherein a respective storage device does not include a flash translation layer module.

7. The method of claim 1, further comprising:

initiating a garbage collection process;

reading, by the control unit, valid data from a plurality of pages of blocks to be recycled, wherein the blocks are associated with the plurality of storage devices;

storing, by the control unit in a temporary data buffer, the valid data read from the plurality of storage devices; and in response to obtaining a full block of data in the temporary data buffer, writing, by the control unit, the data in the full block to an open block of one of the plurality of storage devices.

8. The method of claim 1, wherein writing the data to the non-volatile memory at the physical page address involves:

writing the logical page address for the data in an out of band region of a page at the physical page address in the non-volatile memory; and in response to detecting a power loss or a power failure:

reading out the page at the physical page address;

obtaining the corresponding logical page address previously written in the out of band region of the page; and updating the mapping between the logical page address and the physical page address based on the obtained corresponding logical page address.

9. A computer system for facilitating data storage, the system comprising:

a processor; and a memory coupled to the processor and storing instructions, which when executed by the processor cause the processor to perform a method, the method comprising:

receiving data to be stored in a non-volatile memory of a storage device of a plurality of storage devices;

determining, by a flash translation layer module of a control unit, a physical page address at which the data is to be stored in the non-volatile memory, wherein the control unit is distinct from a host and the plurality of storage devices, and wherein the control unit runs separately from the host and the plurality of storage devices, wherein the flash translation layer module of the control unit determines physical page addresses for first data to be stored in the plurality of storage devices, wherein the control unit communicates with controllers of the plurality of storage devices, and wherein the control unit manages a queue pair comprising a submission queue and a completion queue;

placing, by the control unit in the submission queue, a command to write the data at the physical page address;

storing, by the flash translation layer module of the control unit, a mapping between a logical page address for the data and the physical page address; and writing the data to the non-volatile memory at the physical page address, wherein a controller of the storage device obtains the command from the submission queue, executes the command, and sends to the control unit a complete notification, which causes the control unit to place the command in the completion queue.

10. The computer system of claim 9, wherein the method further comprises:

in response to a query from a host for the physical page address, transmitting, by the control unit to the host, the determined physical page address, wherein the data is held in a volatile memory of the host, wherein the data is written directly, based on a direct memory access protocol, from the volatile memory of the host to the non-volatile memory of the storage device at the physical page address, and wherein the host manages a second queue pair comprising a second submission queue and a second completion queue.

11. The computer system of claim 10, wherein in response to successfully writing the data to the non-volatile memory of the storage device, the controller of the storage device sends a complete notification to the host, and wherein in response to receiving the complete notification, the host updates the second queue pair.

12. The computer system of claim 9, wherein the method further comprises:

holding the data in a volatile memory of the control unit, wherein writing the data to the non-volatile memory at the physical page address involves writing the data directly, based on a direct memory access protocol, from the volatile memory of the control unit to the non-volatile memory of the storage device at the physical page address; and managing, by the control unit, the queue pair comprising the submission queue and the completion queue.

13. The computer system of claim 12, wherein in response to successfully writing the data to the non-volatile memory of the storage device, the controller of the storage device sends to the control unit the complete notification, and wherein the method further comprises:

in response to receiving the complete notification, updating, by the control unit, the queue pair.

14. The computer system of claim 9, wherein the plurality of storage devices includes the storage device, and wherein a respective storage device does not include a flash translation layer module.

15. The computer system of claim 9, wherein the method further comprises:

initiating a garbage collection process;

reading, by the control unit, valid data from a plurality of pages of blocks to be recycled, wherein the blocks are associated with the plurality of storage devices;

storing, by the control unit in a temporary data buffer, the valid data read from the plurality of storage devices; and in response to obtaining a full block of data in the temporary data buffer, writing, by the control unit, the data in the full block to an open block of one of the plurality of storage devices.

16. The computer system of claim 9, wherein writing the data to the non-volatile memory at the physical page address involves:

writing the logical page address for the data in an out of band region of a page at the physical page address in the non-volatile memory; and in response to detecting a power loss or a power failure:

reading out the page at the physical page address;

obtaining the corresponding logical page address previously written in the out of band region of the page; and updating the mapping between the logical page address and the physical page address based on the obtained corresponding logical page address.

17. A non-transitory computer-readable storage medium storing instructions that when executed by a computer cause the computer to perform a method, the method comprising:

receiving data to be stored in a non-volatile memory of a storage device of a plurality of storage devices;

determining, by a flash translation layer module of a control unit, a physical page address at which the data is to be stored in the non-volatile memory, wherein the control unit is distinct from a host and the plurality of storage devices, and wherein the control unit runs separately from the host and the plurality of storage devices, wherein the flash translation layer module of the control unit determines physical page addresses for first data to be stored in a plurality of storage devices, wherein the control unit communicates with controllers of the plurality of storage devices, and wherein the control unit manages a queue pair comprising a submission queue and a completion queue;

placing, by the control unit in the submission queue, a command to write the data at the physical page address;

storing, by the flash translation layer module of the control unit, a mapping between a logical page address for the data and the physical page address; and writing the data to the non-volatile memory at the physical page address, wherein a controller of the storage device obtains the command from the submission queue, executes the command, and sends to the control unit a complete notification, which causes the control unit to place the command in the completion queue.

18. The storage medium of claim 17, further comprising:

in response to a query from a host for the physical page address, transmitting, by the control unit to the host, the determined physical page address, wherein the data is held in a volatile memory of the host, wherein the data is written directly, based on a direct memory access protocol, from the volatile memory of the host to the non-volatile memory of the storage device at the physical page address, wherein the host manages a second queue pair comprising a second submission queue and a second completion queue, wherein in response to successfully writing the data to the non-volatile memory of the storage device, the controller of the storage device sends a complete notification to the host, and wherein in response to receiving the complete notification, the host updates the second queue pair.

19. The storage medium of claim 17, further comprising:

holding the data in a volatile memory of the control unit, wherein writing the data to the non-volatile memory at the physical page address involves writing the data directly, based on a direct memory access protocol, from the volatile memory of the control unit to the non-volatile memory of the storage device at the physical page address;

managing, by the control unit, the queue pair comprising the submission queue and the completion queue;

wherein in response to successfully writing the data to the non-volatile memory of the storage device, the controller of the storage device sends to the control unit the complete notification, and wherein the method further comprises:
in response to receiving the complete notification, updating, by the control unit, the queue pair.

20. The storage medium of claim 17, wherein the method further comprises:
   initiating a garbage collection process;
   reading, by the control unit, valid data from a plurality of pages of blocks to be recycled, wherein the blocks are associated with the plurality of storage devices;
   storing, by the control unit in a temporary data buffer, the valid data read from the plurality of storage devices; and
   in response to obtaining a full block of data in the temporary data buffer, writing, by the control unit, the data in the full block to an open block of one of the plurality of storage devices.

* * * * *